United States Patent [19]

Chance et al.

[11] Patent Number: 5,009,307
[45] Date of Patent: Apr. 23, 1991

[54] SAFETY DEVICE FOR CONVEYOR SYSTEMS

[75] Inventors: Lynn C. Chance, Woodstock; John A. Low, Maurertown, both of Va.

[73] Assignee: Agri-Tech Incorporated

[21] Appl. No.: 379,890

[22] Filed: Jul. 14, 1989

[51] Int. Cl.⁵ .............................................. B65G 47/44
[52] U.S. Cl. .................................... 198/538; 198/323; 198/635
[58] Field of Search ............... 198/323, 524, 535, 538, 198/536, 583, 584, 600, 635, 719, 803.01

[56] References Cited

U.S. PATENT DOCUMENTS

| | | | |
|---|---|---|---|
| 1,555,116 | 9/1925 | Harber | 198/635 |
| 2,755,909 | 7/1956 | Crawford | 198/600 |
| 2,862,599 | 12/1958 | Sinden et al. | 198/323 |
| 3,132,733 | 5/1964 | Boman et al. | 198/323 |
| 3,889,800 | 6/1975 | Frische | 198/803.01 |
| 4,388,990 | 6/1983 | Michalik | 198/803.01 |
| 4,531,630 | 7/1985 | Oury et al. | 198/524 |
| 4,573,565 | 3/1986 | Braun et al. | 198/719 |

Primary Examiner—Joseph E. Valenza
Attorney, Agent, or Firm—Foley & Lardner

[57] ABSTRACT

A safety mechanism for conveyor systems is disclosed that enables components of the system to unfasten when an object, like a person's finger, becomes lodged in a space between two components of the system. The mechanism is automatically releasable when pressure is exerted upon it.

10 Claims, 2 Drawing Sheets

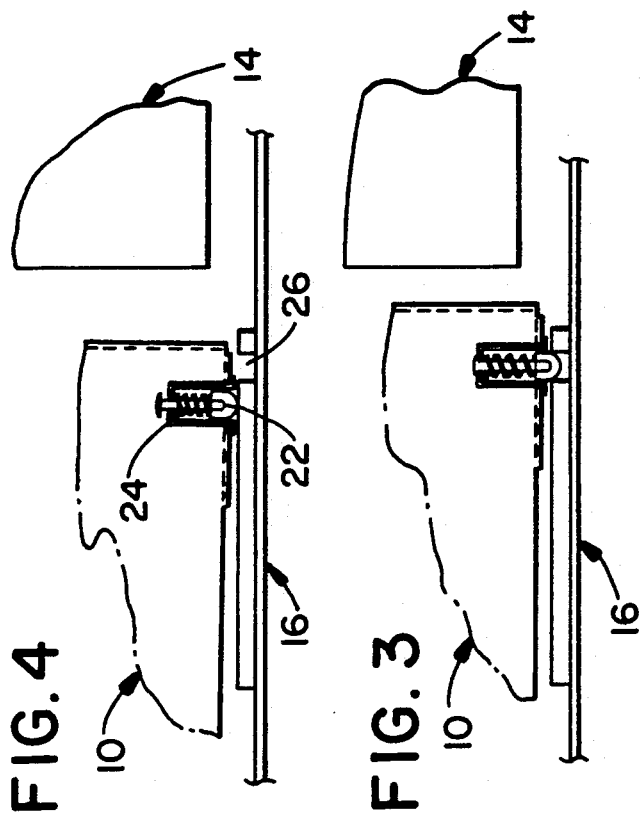
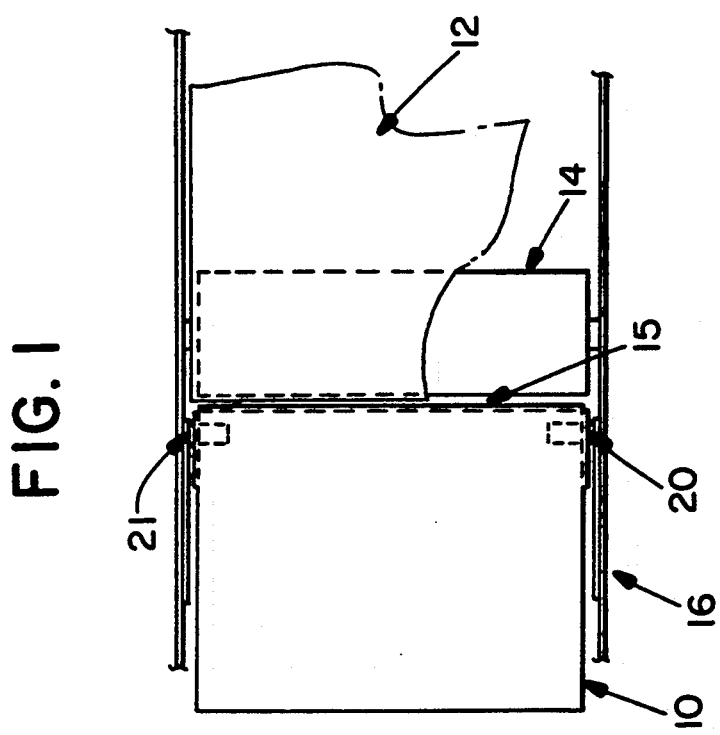
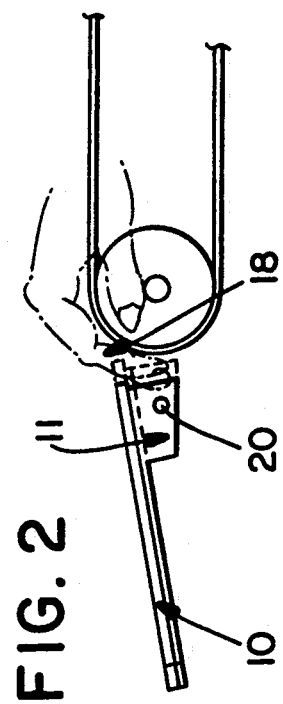

SAFETY DEVICE FOR CONVEYOR SYSTEMS

BACKGROUND OF THE INVENTION

The invention relates in general to a safety device for conveyor systems which contain various moving components. In particular, the invention relates to a device which enables a component of a conveyor system to disengage or "pop out" when a foreign object, like a finger, becomes lodged within the conveyor system.

It is known in the art to provide safety devices for handrail systems for escalators because objects and fingers may become lodged between the moving handrail and an enclosed area in which the direction of the handrail is changed. In general, these safety devices use switches which turn off the entire escalator system when activated. Such a switch is coupled to a device which activates the switch to disconnect power when an object becomes lodged in the clearance area between the handrail and the enclosed area.

Such safety devices are not well suited for economical use in conveyor systems, however, as conveying systems generally have a number of components such as ramps and guards in which a finger or object could become lodged, thereby requiring a large number of switches, wiring, etc. which must be maintained. In addition, although it is possible to provide a switch which turns off the power of the conveyor system when an object becomes lodged in a space within the system, this approach to the problem does not alleviate the danger of someone's finger becoming severely injured by becoming trapped within the conveyor system for a prolonged period of time. Even if the switch is turned off immediately when a person's finger gets caught, the system must be dismantled in order to remove the individual's finger from its trapped position.

Individuals working with conveyor systems usually avoid placing their fingers in regions where a space exists between two components of the system. As conveyor systems consist of many moving parts, however, the possibility also exists that an individual will rest his or her hand on the conveyor belt and allow it to move with the belt into an area where it may become lodged between the belt and another adjacent component. As a result, individuals frequently get their fingers caught between the belt and the adjacent component of the conveyor system. Accordingly, it would be desirable to provide a simple and inexpensive system which immediately releases the lodged finger.

SUMMARY OF THE INVENTION

An object of the invention is to provide a safety mechanism which allows an element of a conveyor system to automatically disengage or "pop out" when an object, like a person's finger, becomes fixed between two elements of the system, such as a ramp and a conveyor belt or a back-stop and conveyor belt.

Another object of the invention is to provide a safety mechanism which is inexpensive as well as simple in order to ensure the safety of individuals who must work with conveyor systems.

A still further object of the invention is to provide a safety mechanism which does not require maintenance.

These objects are accomplished by using a mechanism to hold a component of the conveyor system in place which disconnects when pressure from an object, such as a finger fixed between two components of the system, is exerted on the mechanism. Thus, a finger which gets caught in a space will only be subject to a minor amount of pressure before the component disconnects and the individual can remove his or her finger from the trapped position.

Other objects, features and advantages of the invention will become apparent from the following description of the preferred embodiments of the invention taken in conjunction with the accompanying drawings.

BRIEF DESCRIPTION OF THE DRAWINGS

With the above as background, reference should now be made to the following detailed description of the preferred embodiment of the invention in conjunction with the drawings in which:

FIG. 1 is a top view of a first embodiment of the present invention;

FIG. 2 is a side view of the first embodiment of the present invention;

FIG. 3 is a bottom view of the first embodiment of the present invention illustrating the spring loaded fastener in place;

FIG. 4 is a bottom view of the first embodiment of the present invention illustrating the spring loaded fastener after it is dislodged by an object;

DETAILED DESCRIPTION OF THE PREFERRED EMBODIMENT

Figure 5:
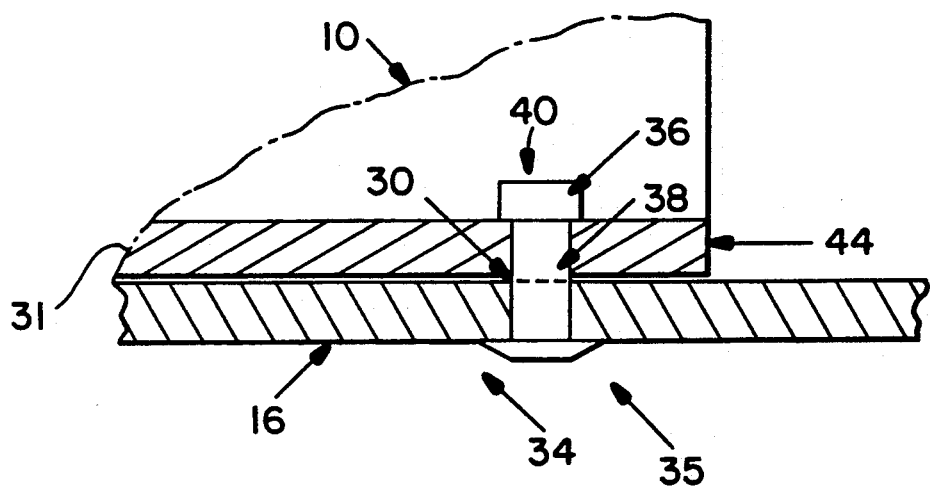
FIG. 5 is a bottom view of a second embodiment of the present invention.

Referring now to FIG. 1, a conveyor system is shown having ramp 10, a conveyor roller 14, conveyor belting 12, a side panel 16 and spring loaded fasteners 20 and 21. A clearance space 15 is provided between the conveyor roller 14 and the ramp 10.

FIG. 3 shows structure of the spring loaded fasteners 20 and 21 in more detail. Each of the spring loaded fasteners 20 and 21 has a detent 22 and a spring 24. When the ramp is in place the detent 22 fits into slot 26 located in the side panel 16 and the spring 24 is compressed so that the side of the ramp is held in place.

FIG. 2 illustrates a finger lodged between the conveyor roller and ramp so that the finger exerts pressure on the ramp. When a finger or other object becomes trapped within the space between the conveyor roller 14 and ramp 10 a force is exerted upon the ramp 10 or the lower portion of the ramp 11 which contains the spring loaded fastener 20 and 21. As a result of the force, the detent 22 of at least one of the spring loaded fasteners 20 and 21 is dislodged as illustrated in FIG. 4 and the ramp is disengaged from the side panel 16, thereby preventing injury to a person's finger or damage to the conveyor system from a trapped object.

Although the illustrated embodiment shows the use of the spring loaded fasteners 20 and 21 to connect a ramp to side panels of the conveyor system, it will be readily understood that the fasteners can also be employed to connect other types of components together, such as backstops and safety guards. The invention is also readily applicable to other conveying mechanisms other than conveyor belts where the possibility of trapping an object between the conveying mechanism and another component of the conveyor system is likely.

FIG. 5 illustrates a second embodiment of the invention which utilizes a shear fastener 40. The shear fastener 40 preferably includes a plastic head 36, plastic body 38, and ears 34. The ears 34 and 35 are flexible so that the fasteners can be inserted in a hole which passes through a side 31 of the ramp 10 and the side panel 16. As the fastener passes through the hole, the ears 34 and 35 flex back and grip the outside surface of the side panel 16.

If a finger or other object becomes caught within the space between the roller 14 and ramp 15, a force in the direction of arrow 44 is exerted on the fastener 40 which breaks along a shear line 30 resulting in the ramp 10 disconnecting from the side panel 16. The fastener 40 can be either be made of a sufficiently soft material to insure proper shearing, or a relief or score line can be cut into the body 38 of the fastener at the intended shear line.

Although the invention has been described with particular reference to certain preferred embodiments, modifications and variations may be effected within the spirit and scope of the invention. For example, a ramp of the conveyor which would allow the ramp to flex and disengage from its fasteners when a finger became caught in the space between the conveyor belt and the ramp. Different types of shear fasteners may also be employed.

What is claimed is:

1. A conveyor system comprising:
   (A) a conveying mechanism which moves in a direction of conveyance;
   (B) first and second components of said conveyor system spaced adjacent to said conveying mechanism; and
   (C) a spring biased fastener which directs a fastening force perpendicular to the direction of conveyance thereby to detachably connect said first component to said second component, wherein said fastener is adapted to release to disconnect said first component from said second component under the pressure of an object lodged between said conveying mechanism and said first component in order to prevent damage to said object.

2. A conveyor system according to claim 1, wherein said conveying mechanism includes at least one roller and a conveyor belt which moves over said roller.

3. A conveyor system according to claim 2, wherein said first component comprises a ramp located at an end of said conveying belt and said second component comprises a side panel of said conveyor system.

4. A conveyor system according to claim 3, wherein said fastener comprises a spring loaded detent located in s recess of said ramp, which spring loaded detent engages a slot in said side panel.

5. A conveyor mechanism according to claim 1, wherein said fastener comprises a spring loaded fastener.

6. A conveyor mechanism according to claim 5, wherein said fastener comprises a spring loaded detent located in a recess in said first component, which detent engages a slot in said second component.

7. A conveyor system comprising:
   (A) conveying means for conveying objects along a conveying path;
   (B) first and second components of said conveyor system spaced adjacent to said conveying means; and
   (C) fastening means for attaching said first component of said conveyor system to said second component of said conveyor system, wherein said fastening means comprises a spring biased fastener which directs a fastening force perpendicular to said conveying path thereby to detachably connect said first component to said second component, and wherein said spring biased fastener releases to disconnect said first component from said second component when pressure is exerted on said fastening means do to the presence of an object lodged between said conveying means and said first component.

8. A conveyor system according to claim 7, wherein said conveying means comprises at least one roller and a belt which moves over said roller.

9. A conveyor system according to claim 8, wherein said first component comprises a ramp located at an end of said conveying belt and said second component comprises a side panel of said conveyor system.

10. A conveyor system according to claim 9, wherein said fastener comprises a spring loaded detent located in a recess of said ramp, which spring loaded detent engages a slot in said side panel.

* * * * *